(12) United States Patent
Kaneichi (10) Patent No.: US 11,603,118 B2
(45) Date of Patent: Mar. 14, 2023

(54) RIDING DETERMINATION PROGRAM, TERMINAL DEVICE, COMMUNICATION SYSTEM, AND RIDING DETERMINATION METHOD

(71) Applicant: TOYOTA JIDOSHA KABUSHIKI KAISHA, Toyota (JP)

(72) Inventor: Daiki Kaneichi, Shinagawa-ku (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 83 days.

(21) Appl. No.: 17/218,272

(22) Filed: Mar. 31, 2021

(65) Prior Publication Data
US 2021/0370987 A1 Dec. 2, 2021

(30) Foreign Application Priority Data
May 29, 2020 (JP) .............................. JP2020-094760

(51) Int. Cl.
*B60W 60/00* (2020.01)
*G01C 21/36* (2006.01)
*G01C 21/34* (2006.01)
*G05D 1/02* (2020.01)

(52) U.S. Cl.
CPC ............... *B60W 60/00253* (2020.02); *G01C 21/3423* (2013.01); *G01C 21/362* (2013.01); *B60W 2540/01* (2020.02); *B60W 2556/50* (2020.02); *G05D 1/0276* (2013.01)

(58) Field of Classification Search
CPC .................. B60W 60/00253; B60W 60/00
See application file for complete search history.

(56) References Cited

U.S. PATENT DOCUMENTS

| | | | |
|---|---|---|---|
| 6,259,988 B1* | 7/2001 | Galkowski | G05D 1/0005 340/995.22 |
| 2010/0216509 A1* | 8/2010 | Riemer | H04M 1/72463 455/557 |
| 2015/0179000 A1* | 6/2015 | Jayanthi | H04M 1/72457 701/32.4 |
| 2021/0043084 A1 | 2/2021 | Kaneichi | |

FOREIGN PATENT DOCUMENTS

| | | |
|---|---|---|
| JP | 2019-41344 A | 3/2019 |
| JP | 2021-28589 A | 2/2021 |

* cited by examiner

*Primary Examiner* — Vivek D Koppikar
*Assistant Examiner* — Godfrey Aleksander Maciorowski
(74) *Attorney, Agent, or Firm* — Oblon, McClelland, Maier & Neustadt, L.L.P.

(57) ABSTRACT

A terminal device includes a communication unit configured to communicate with a communication device used in a vehicle and a control unit configured to determine whether a user is in the vehicle when a signal sent from the communication device is received via the communication unit, according to at least one of whether a destination has been set by the user and whether a vehicle dispatch application is activated. The vehicle dispatch application is a program for receiving a vehicle dispatch service.

17 Claims, 8 Drawing Sheets

RIDING DETERMINATION PROGRAM, TERMINAL DEVICE, COMMUNICATION SYSTEM, AND RIDING DETERMINATION METHOD

CROSS-REFERENCE TO RELATED APPLICATION

This application claims priority to Japanese Patent Application No. 2020-094760 filed on May 29, 2020, incorporated herein by reference in its entirety.

BACKGROUND

1. Technical Field

The present disclosure relates to a riding determination program, a terminal device, a communication system, and a riding determination method.

2. Description of Related Art

Japanese Unexamined Patent Application Publication No. 2019-041344 (JP 2019-041344 A) describes a technique in which a mobile terminal sends the riding signal while the wireless signal is received from a signal transmitter installed in a vehicle and sends the drop-off signal when the wireless signal is no longer received.

SUMMARY

According to the technique described in JP 2019-041344 A, when a user terminal located around the vehicle receives the wireless signal, it may be determined erroneously that the user is already in the vehicle. Therefore, it is desired to improve the accuracy in determining whether the user is in the vehicle.

The present disclosure improves the accuracy in determining whether the user is in the vehicle.

A first aspect of the present disclosure relates to a riding determination program that causes a computer to perform an operation when a signal sent from a communication device is received via a communication unit. The computer includes the communication unit configured to communicate with the communication device used in a vehicle. The operation includes determining whether a user is in the vehicle according to at least one of whether a destination has been set by the user and whether a vehicle dispatch application is activated. The vehicle dispatch application is a program for receiving a vehicle dispatch service.

A second aspect of the present disclosure relates to a terminal device including a communication unit and a control unit. The communication unit is configured to communicate with a communication device used in a vehicle. The control unit is configured to determine whether a user is in the vehicle when a signal sent from the communication device is received via the communication unit, according to at least one of whether a destination has been set by the user and whether a vehicle dispatch application is activated. The vehicle dispatch application is a program for receiving a vehicle dispatch service.

A third aspect of the present disclosure relates to a riding determination method including sending and determining. The sending a signal is performed by a communication device used in a vehicle. The determining whether the user is in the vehicle when the signal sent from the communication device is received is performed by a terminal device carried by a user, according to at least one of whether a destination has been set by the user and whether a vehicle dispatch application is activated. The vehicle dispatch application is a program for receiving a vehicle dispatch service.

According to the present disclosure, the accuracy in determining whether a user is in a vehicle is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below with reference to the drawings.

In the figures, the same or equivalent components are designated by the same reference numerals. In the description of this embodiment, the description of the same or equivalent components will be omitted or simplified as appropriate.

Figure 1:
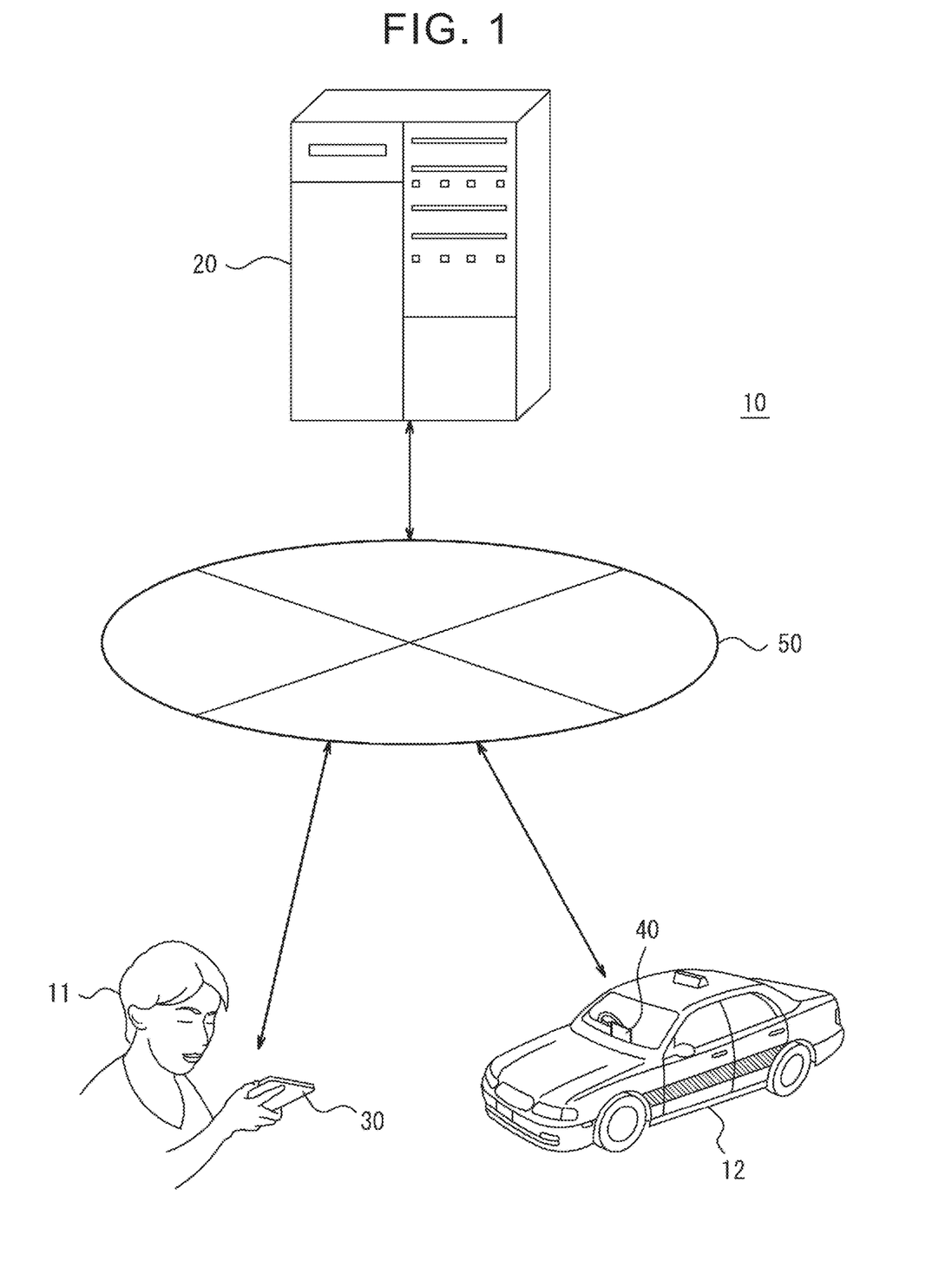
FIG. 1 is a diagram showing a configuration of a communication system according to an embodiment of the present disclosure.

The configuration of a communication system 10 according to this embodiment will be described with reference to FIG. 1.

The communication system 10 according to this embodiment includes at least one control device 20, at least one terminal device 30, and at least one communication device 40.

The control device 20 can communicate with the terminal device 30 and the communication device 40 via a network 50.

The network 50 includes the Internet, at least one WAN, at least one MAN, or a combination of these networks. "WAN" is an abbreviation for wide area network. "MAN" is an abbreviation for metropolitan area network. The network 50 may include at least one wireless network, at least one optical network, or a combination of these networks. The wireless network is, for example, an ad hoc network, a cellular network, a wireless LAN, a satellite communication network, or a terrestrial microwave network. "LAN" is an abbreviation for local area network.

The control device 20 is installed in a facility such as a data center. The control device 20 is a server belonging, for example, to a cloud computing system or any other types of computing systems.

The terminal device 30 is carried by a user. The terminal device 30 is a mobile device, such as a mobile phone, a smartphone, or a tablet, or is a PC. "PC" is an abbreviation for personal computer.

The communication device 40 is mounted or installed in a vehicle 12 such as a taxi or an on-demand bus. Instead of being mounted or installed in the vehicle 12, the communication device 40 is sometimes carried by the driver of the vehicle 12. The communication device 40 is, for example, an in-vehicle device such as a car navigation device, or is a mobile device such as a mobile phone, a smartphone, or a tablet, or is a PC.

The vehicle 12 is any type of automobile, including a gasoline vehicle, a diesel vehicle, an HV, a PHV, an EV, or an FCV. "HV" is an abbreviation for hybrid vehicle. "PHV" is an abbreviation for plug-in hybrid vehicle. "EV" is an abbreviation for electric vehicle. "FCV" is an abbreviation for fuel cell vehicle. Although driven by a driver in this embodiment, the vehicle 12 may be driven autonomously at any autonomous driving level. The autonomous driving level is, for example, one of level 1 to level 5 of SAE autonomous driving levels. "SAE" is an abbreviation for Society of Automotive Engineers. The vehicle 12 may be a MaaS vehicle. "MaaS" is an abbreviation for Mobility as a Service.

The outline of this embodiment will be described below with reference to FIG. 1.

In this embodiment, the communication device 40 used in the vehicle 12 sends the signal. When the signal sent from the communication device 40 is received, the terminal device 30 carried by a user 11 determines whether the user 11 is in the vehicle 12 according to at least one of whether the destination has been set by the user 11 and whether the vehicle dispatch application, which is a program for receiving the vehicle dispatch service, is activated.

This embodiment makes it easy to prevent an erroneous determination that the user 11 is in the vehicle 12, improving the accuracy in determining whether the user 11 is in the vehicle.

In this embodiment, the terminal device 30 sends first data to the control device 20. The first data notifies about the destination set by the user 11 together with the user identifier corresponding to the user 11. The control device 20 receives the first data from the terminal device 30.

In response to an operation of the user 11, the terminal device 30 acquires the vehicle identifier corresponding to the vehicle 12 in which the user 11 is travelling. The terminal device 30 sends second data to the control device 20. The second data notifies about the acquired vehicle identifier together with the user identifier corresponding to the user 11. The control device 20 receives the second data from the terminal device 30.

The control device 20 refers to the first data and the second data both of which have a common user identifier and, then, sends the destination data, which notifies about the destination, to the communication device 40. The communication device 40 receives the destination data from the control device 20.

According to this embodiment, the information on the destination, which is set by the user 11, can be used for setting the destination of the vehicle 12 in which the user 11 is travelling. For example, using the information on the destination for multimodal navigation or single-modal navigation that has been entered by the user 11 into the terminal device 30, the communication device 40 can set the destination for car navigation. "Multimodal navigation" is navigation in which a multimodal route is guided. The "multimodal route" is a route on which the user will move using a combination of one or more means of transportation selected from among a plurality of types of transportation including the vehicle 12. The "plurality means of transportation" includes, for example, a taxi that is the vehicle 12 and, in addition, may include various means of transportation such as walking, a bicycle, a bus, a rental car, a private car, a railroad, or an airplane. "Single-modal navigation" is navigation in which a single-modal route is guided. The "single-modal route" is a route on which the user will move using one of the means of transportation, either first means of transportation including the vehicle 12 or the second means of transportation not including the vehicle 12, whichever is selected by the user 11. The "first means of transportation" is, for example, a taxi that is the vehicle 12, and may include accompanying means of transportation such as walking or a bicycle. The "second means of transportation" is, for example, a bus or a railroad, which is public transportation, or a combination thereof and may include accompanying means of transportation such as walking or a bicycle.

In this embodiment, the destination is set, the user 11 is determined to be in the vehicle 12, and the riding procedure operation is performed and, after that, the control device 20 determines the route to the destination based on the position data on the vehicle 12. The control device 20 sends the route data, which notifies about the determined route, to the communication device 40. The communication device 40 receives the route data from the control device 20. By referring to the received route data, the communication device 40 guides the driver of the vehicle 12 along the route to the destination. That is, after the riding procedure operation is performed, the communication device 40 guides the driver of the vehicle 12 to the destination according to the position data on the vehicle 12. Note that, instead of the control device 20, the communication device 40 may determine the route that is output to guide the driver of the vehicle 12.

The "riding procedure operation" is an operation to acquire the vehicle identifier corresponding to the vehicle 12 in which the user 11 is travelling. Such operations include, for example, an operation to point the camera of the terminal device 30 at the display that displays the vehicle identifier in the vehicle cabin of the vehicle 12 or an operation to place the tag of the terminal device 30 over the reader/writer that sends the vehicle identifier in vehicle cabin of the vehicle 12.

According to this embodiment, after determining that the user 11 is in the vehicle 12, the driver of the vehicle 12 can use the navigation function.

Figure 2:
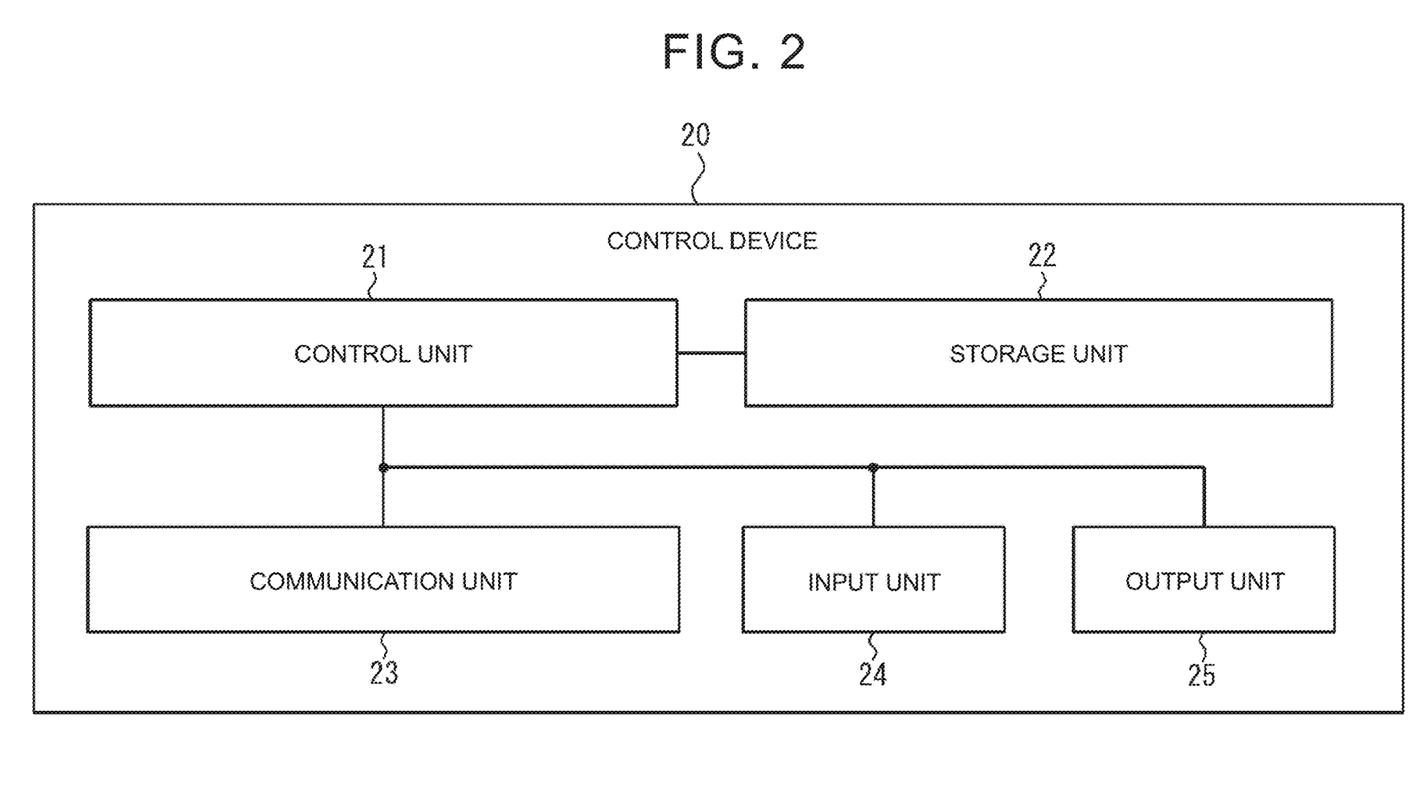
FIG. 2 is a block diagram showing a configuration of a control device according to the embodiment of the present disclosure.

The configuration of the control device 20 according to this embodiment will be described with reference to FIG. 2.

The control device 20 includes a control unit 21, a storage unit 22, a communication unit 23, an input unit 24, and an output unit 25.

The control unit 21 includes at least one processor, at least one dedicated circuit, or a combination thereof. The processor is a general-purpose processor such as a CPU or a GPU or is a dedicated processor specialized for specific processing. "CPU" is an abbreviation for central processing unit. "GPU" is an abbreviation for graphics processing unit. The dedicated circuit is, for example, an FPGA or an ASIC. "FPGA" is an abbreviation for field-programmable gate array. "ASIC" is an abbreviation for application specific integrated circuit. The control unit 21 performs processing related to the operation of the control device 20 while controlling the components of the control device 20.

The storage unit 22 includes at least one semiconductor memory, at least one magnetic memory, at least one optical memory, or a combination of at least two types of these memories. The semiconductor memory is, for example, a RANI or a ROM. "RAM" is an abbreviation for random access memory. "ROM" is an abbreviation for read only memory. The RAM is, for example, an SRAM or a DRAM. "SRAM" is an abbreviation for static random access memory. "DRAM" is an abbreviation for dynamic random access memory. The ROM is, for example, an EEPROM. "EEPROM" is an abbreviation for electrically erasable programmable read only memory. The storage unit 22 functions, for example, as a main storage device, an auxiliary storage device, or a cache memory. The storage unit 22 stores data to be used for the operation of the control device 20 and data obtained by the operation of the control device 20.

The communication unit 23 includes at least one communication interface. The communication interface is, for example, the LAN interface. The communication unit 23 receives data to be used for the operation of the control device 20 and sends data obtained by the operation of the control device 20.

The input unit 24 includes at least one input interface. The input interface is, for example, physical keys, capacitive keys, a pointing device, a touch screen integrated with a display, or a microphone. The input unit 24 accepts an operation to enter data to be used for the operation of the control device 20. The input unit 24 may be connected to the control device 20 as an external input device instead of being provided in the control device 20. The input unit 24 may be connected using any connection method such as USB, HDMI (registered trademark), or Bluetooth (registered trademark). "USB" is an abbreviation for Universal Serial Bus. "HDMI (registered trade mark)" is an abbreviation for High-Definition Multimedia Interface.

The output unit 25 includes at least one output interface. The output interface is, for example, a display or a speaker. The display is, for example, an LCD or an organic EL display. "LCD" is an abbreviation for liquid crystal display. "EL" is an abbreviation for electro luminescence. The output unit 25 outputs data obtained by the operation of the control device 20. The output unit 25 may be connected to the control device 20 as an external output device instead of being provided with the control device 20. The output unit 25 may be connected using any connection method such as USB, HDMI (registered trademark), or Bluetooth (registered trademark).

The function of the control device 20 is implemented by executing the control program according to this embodiment by the processor corresponding to the control unit 21. That is, the function of the control device 20 is implemented by software. The control program causes the computer to function as the control device 20 by causing the computer to perform the operation of the control device 20. That is, the computer functions as the control device 20 by performing the operation of the control device 20 according to the control program.

The program can be stored on a non-transitory computer-readable medium. The non-transitory computer-readable medium is, for example, a magnetic recording device, an optical disc, an optical magnetic recording medium, or a ROM. The program is distributed, for example, by selling, transferring, or renting a portable medium such as a DVD or CD-ROM in which the program is stored. "DVD" is an abbreviation for digital versatile disc. "CD-ROM" is an abbreviation for compact disc read only memory. The program may be distributed by storing the program in the storage of a server and then transferring the program from the server to another computer. The program may also be provided as a program product.

The computer stores the program, stored in a portable recording medium, or the program, transferred from a server, once in the main storage device. After that, the computer reads the program from the main storage device by the processor and performs processing on the processor according to the program that has been read. The computer may also read the program directly from the portable recording medium and perform processing according to the program. In addition, each time the program is transferred from the server to the computer, the computer may perform processing sequentially according to the received program. Furthermore, the computer may perform processing by the so-called ASP-type service, in which case, instead of transferring the program from the server to the computer, the function is implemented only by issuing an execution instruction and then acquiring the result. "ASP" is an abbreviation for application service provider. The program includes program-like information that is used in the processing by the computer. For example, the "program-like information" includes data that is not a command directly sent to a computer but is used to specify computer processing.

A part of or all of the functions of the control device 20 may be implemented by a dedicated circuit corresponding to the control unit 21. That is, a part of or all of the functions of the control device 20 may be implemented by hardware.

Figure 3:
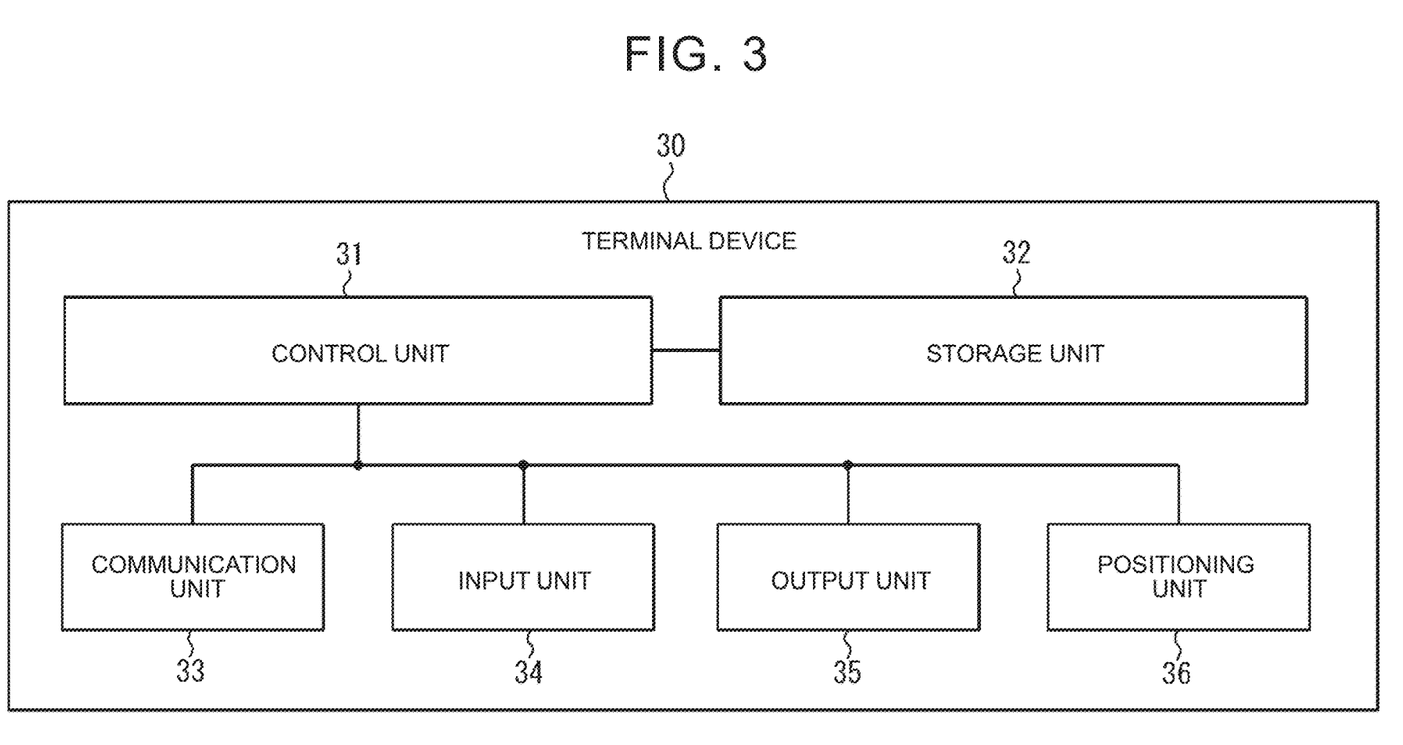
FIG. 3 is a block diagram showing a configuration of a terminal device according to the embodiment of the present disclosure.

The configuration of the terminal device 30 according to this embodiment will be described with reference to FIG. 3.

The terminal device 30 includes a control unit 31, a storage unit 32, a communication unit 33, an input unit 34, an output unit 35, and a positioning unit 36.

The control unit 31 includes at least one processor, at least one dedicated circuit, or a combination thereof. The processor is a general-purpose processor such as a CPU or a GPU or is a dedicated processor specialized for specific processing. The dedicated circuit is, for example, an FPGA or an ASIC. The control unit 31 performs processing related to the operation of the terminal device 30 while controlling the components of the terminal device 30.

The storage unit 32 includes at least one semiconductor memory, at least one magnetic memory, at least one optical memory, or a combination of at least two types of these memories. The semiconductor memory is, for example, a RANI or a ROM. The RANI is, for example, an SRAM or a DRAM. The ROM is, for example, an EEPROM. The storage unit 32 functions, for example, as a main storage device, an auxiliary storage device, or a cache memory. The storage unit 32 stores data to be used for the operation of the terminal device 30 and data obtained by the operation of the terminal device 30.

The communication unit 33 includes at least one communication interface. The communication interface is, for example, an interface that supports mobile communication standards such as the LTE standard, 4G standard, or 5G standard, an interface that supports near field wireless communication such as Bluetooth (registered trademark), or the LAN interface. "LTE" is an abbreviation for Long Term Evolution. "4G" is an abbreviation for 4th generation. "5G" is an abbreviation for 5th generation. The communication unit 33 receives data to be used for the operation of the terminal device 30 and sends data obtained by the operation of the terminal device 30.

The input unit 34 includes at least one input interface. The input interface is, for example, physical keys, capacitive keys, a pointing device, a touch screen integrated with a display, or a microphone. The input unit 34 accepts an operation to enter data to be used for the operation of the terminal device 30. The input unit 34 may be connected to the terminal device 30 as an external input device instead of being provided with the terminal device 30. The input unit 34 may be connected using any connection method such as USB, HDMI (registered trademark), or Bluetooth (registered trademark).

The output unit 35 includes at least one output interface. The output interface is, for example, a display or a speaker. The display is, for example, an LCD or an organic EL display. The output unit 35 outputs data obtained by the operation of the terminal device 30. The output unit 35 may be connected to the terminal device 30 as an external output device instead of being provided with the terminal device 30. The output unit 35 may be connected using any connection method such as USB, HDMI (registered trademark), or Bluetooth (registered trademark).

The positioning unit 36 includes at least one GNSS receiver. "GNSS" is an abbreviation for global navigation satellite system. The GNSS is, for example, GPS, QZSS, GLONASS, or Galileo. "GPS" is an abbreviation for Global Positioning System. "QZSS" is an abbreviation for Quasi-Zenith Satellite System. The QZSS satellite is called a quasi-zenith satellite. "GLONASS" is an abbreviation for Global Navigation Satellite System. The positioning unit 36 measures the position of the terminal device 30.

The function of the terminal device 30 is implemented by executing the riding determination program according to this embodiment by the processor corresponding to the control unit 31. That is, the function of the terminal device 30 is implemented by software. The riding determination program causes the computer to function as the terminal device 30 by causing the computer to perform the operation of the terminal device 30. That is, the computer functions as the terminal device 30 by performing the operation of the terminal device 30 according to the riding determination program.

A part of or all of the functions of the terminal device 30 may be implemented by a dedicated circuit corresponding to the control unit 31. That is, a part of or all of the functions of the terminal device 30 may be implemented by hardware.

Figure 4:
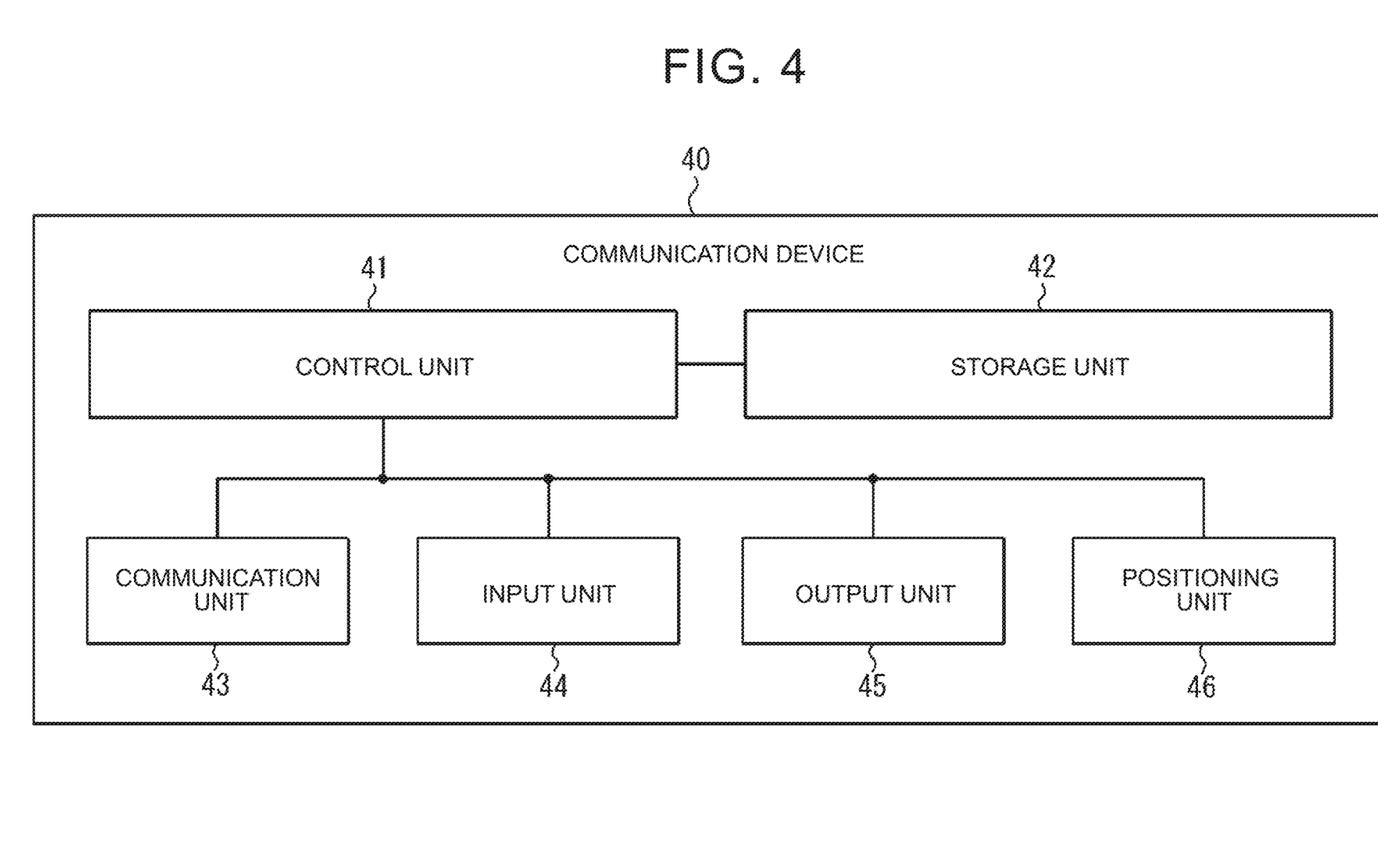
FIG. 4 is a block diagram showing a configuration of a communication device according to the embodiment of the present disclosure.

The configuration of the communication device 40 according to this embodiment will be described with reference to FIG. 4.

The communication device 40 includes a control unit 41, a storage unit 42, a communication unit 43, an input unit 44, an output unit 45, and a positioning unit 46.

The control unit 41 includes at least one processor, at least one dedicated circuit, or a combination thereof. The processor is a general-purpose processor such as a CPU or a GPU or is a dedicated processor specialized for specific processing. The dedicated circuit is, for example, an FPGA or an ASIC. The control unit 41 may include at least one ECU. "ECU" is an abbreviation for electronic control unit. The control unit 41 performs processing related to the operation of the communication device 40 while controlling the components of the communication device 40.

The storage unit 42 includes at least one semiconductor memory, at least one magnetic memory, at least one optical memory, or a combination of at least two types of these memories. The semiconductor memory is, for example, a RAM or a ROM. The RAM is, for example, an SRAM or a DRAM. The ROM is, for example, an EEPROM. The storage unit 42 functions, for example, as a main storage device, an auxiliary storage device, or a cache memory. The storage unit 42 stores data to be used for the operation of the communication device 40 and data obtained by the operation of the communication device 40.

The communication unit 43 includes at least one communication interface. The communication interface is, for example, an interface that supports mobile communication standards such as the LTE standard, 4G standard, or 5G standard, an interface that supports near field wireless communication such as Bluetooth (registered trademark), or the LAN interface. The communication unit 43 receives data to be used for the operation of the communication device 40 and sends data obtained by the operation of the communication device 40.

The input unit 44 includes at least one input interface. The input interface is, for example, physical keys, capacitive keys, a pointing device, a touch screen integrated with a display, or a microphone. The input unit 44 accepts an operation to enter data to be used for the operation of the communication device 40. The input unit 44 may be connected to the communication device 40 as an external input device instead of being provided with the communication device 40. The input unit 44 may be connected using any connection method such as USB, HDMI (registered trademark), or Bluetooth (registered trademark).

The output unit 45 includes at least one output interface. The output interface is, for example, a display or a speaker. The display is, for example, an LCD or an organic EL display. The output unit 45 outputs data obtained by the operation of the communication device 40. The output unit 45 may be connected to the communication device 40 as an external output device such as a display audio instead of being provided with the communication device 40. The output unit 45 may be connected using any connection method such as USB, HDMI (registered trademark), or Bluetooth (registered trademark).

The positioning unit 46 includes at least one GNSS receiver. The GNSS is, for example, GPS, QZSS, GLONASS, or Galileo. The positioning unit 46 measures the position of the communication device 40.

The function of the communication device 40 is implemented by executing the communication program according to this embodiment by the processor corresponding to the control unit 41. That is, the function of the communication device 40 is implemented by software. The communication program causes the computer to function as the communication device 40 by causing the computer to perform the operation of the communication device 40. That is, the computer functions as the communication device 40 by performing the operation of the communication device 40 according to the communication program.

A part of or all of the functions of the communication device 40 may be implemented by a dedicated circuit corresponding to the control unit 41. That is, a part of or all of the functions of the communication device 40 may be implemented by hardware.

The operation of the communication system 10 according to this embodiment will be described with reference to FIG. 5, FIG. 6, and FIG. 7. This operation corresponds to the riding determination method according to this embodiment.

Figure 5:
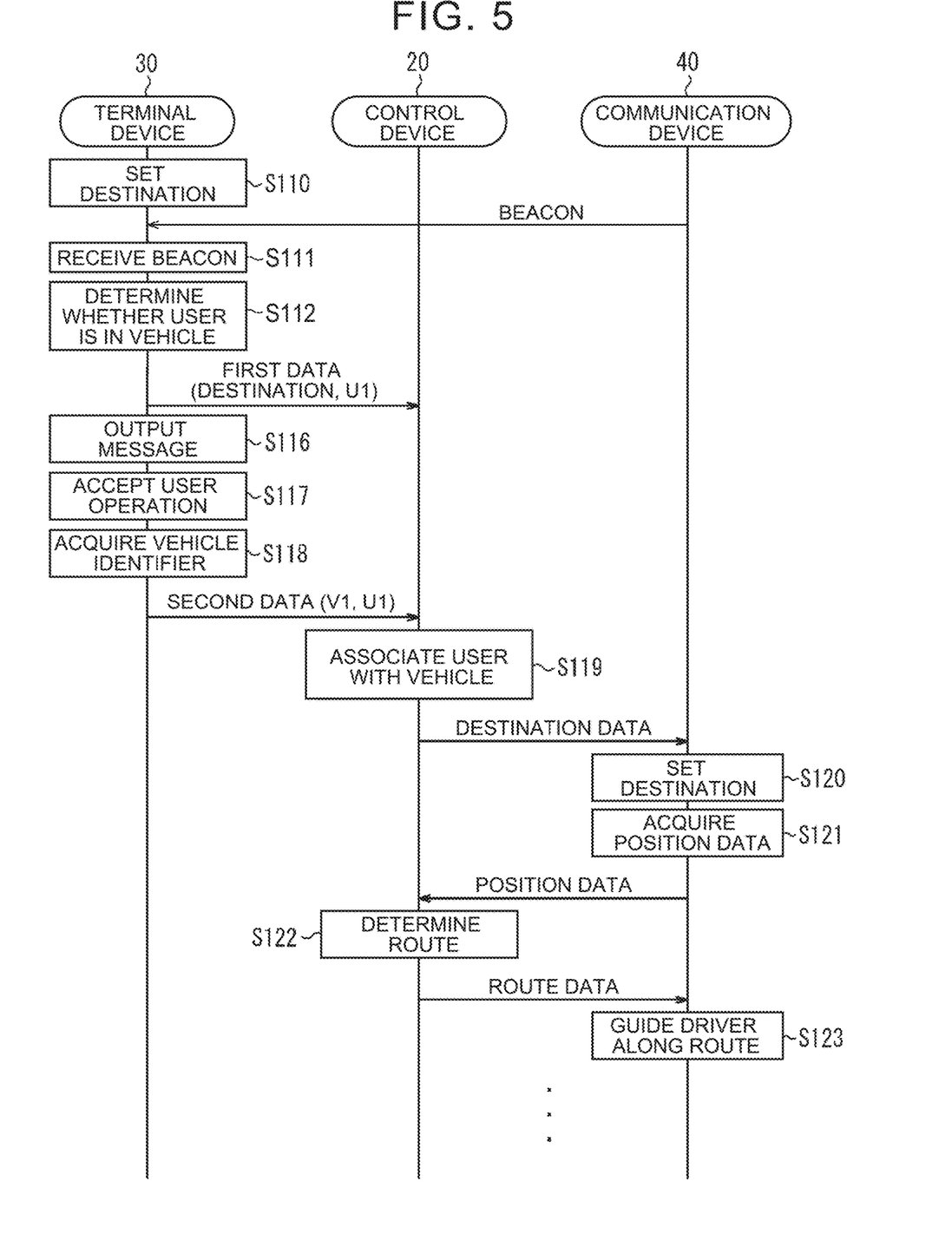
FIG. 5 is a diagram showing the operation of the communication system according to the embodiment of the present disclosure.

FIG. 5 shows the general processing flow of the communication system 10 according to this embodiment.

In one example described below, it is assumed that the user 11 has activated a multimodal navigation application on the terminal device 30 of the user 11. It is also assumed that the user 11 has set the destination by entering it from the input unit 34 of the terminal device 30 (step S110).

In step S111 in FIG. 5, the communication unit 33 of the terminal device 30 of the user 11 receives the beacon sent in the cabin of the vehicle 12 in which the user 11 is riding. The beacon may be sent and received using any communication method, for example, via Bluetooth (registered trademark). This beacon, when received by the communication unit 33, acts as a trigger to cause the control unit 31 of the terminal device 30 to determine, in step S112, whether the user 11 is in the vehicle 12.

Figure 6:
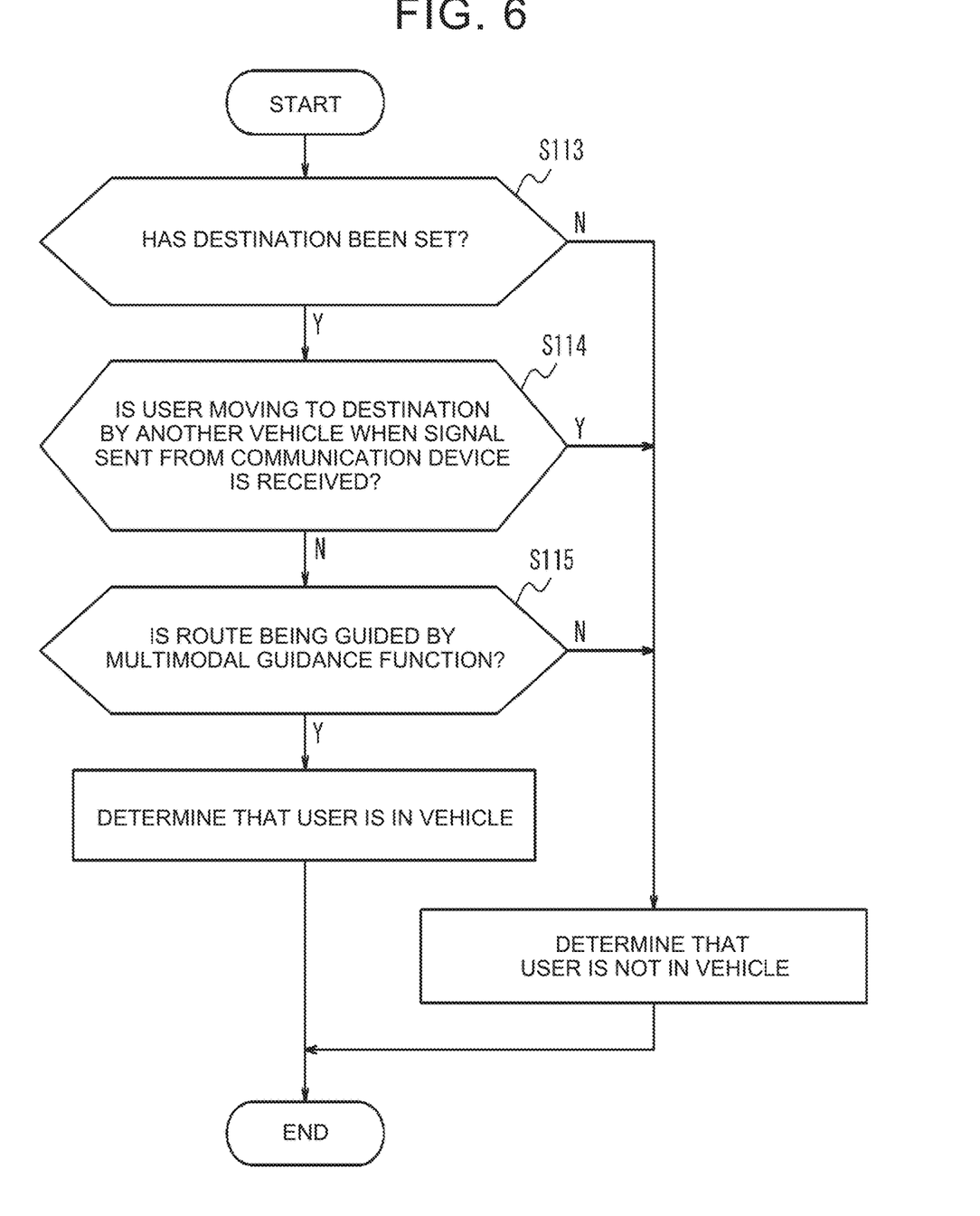
FIG. 6 is a flowchart showing the operation of a control unit of the terminal device according to the embodiment of the present disclosure.

FIG. 6 shows a detailed processing flow of the riding determination processing performed in step S112 in FIG. 5. The processing in FIG. 6 is performed by the control unit 31 of the terminal device 30.

First, in step S113, the control unit 31 checks whether the destination has been set. The destination is set by the user 11 via the input unit 34 of the terminal device 30. When the destination has not been set, the control unit 31 determines that the user 11 is not in the vehicle 12. On the other hand, when the destination has been set, the processing of the control unit 31 proceeds to step S114. In this example, since the destination has been set, the processing of the control unit 31 proceeds to step S114.

Next, in step S114, the control unit 31 checks whether the user 11 is moving to the destination by another vehicle at the time when the signal sent from the communication device 40 is received. Another vehicle mentioned here refers to a vehicle other than the vehicle 12. To determine whether the user 11 is moving by another vehicle, the control unit 31 uses, for example, the GPS function of the positioning unit 36 of the terminal device 30 or the motion detection sensor provided in the terminal device 30 to check whether the terminal device 30 is moving at a speed. Alternatively, the control unit 31 may check the riding determination history of the terminal device 30 and, based on the time when the user 11 was determined to ride last, determine whether the user 11 is moving by another vehicle. When the user 11 is moving to the destination by another vehicle at the time when the signal sent from the communication device 40 is received, the control unit 31 determines that the user 11 is not in the vehicle 12. When the user 11 is not moving to the destination by another vehicle at the time when the signal sent from the communication device 40 is received, the processing of the control unit 31 proceeds to step S115. In this example, since the user 11 is not moving to the destination by another vehicle, the processing of the control unit 31 proceeds to step S115.

Next, in step S115, the control unit 31 of the terminal device 30 checks whether a route on which the user 11 will move to the destination is being guided by the multimodal guidance function that guides a route on which the user will move using a combination of one or more means of transportation selected from among a plurality means of transportation including the vehicle 12. The multimodal guidance function is the function in which the control unit 31 guides a multimodal route for the user 11. When a route on which the user 11 will move to the destination using a combination of means of transportation including the vehicle 12 is not being guided by the multimodal guidance function, the control unit 31 determines that the user 11 is not in the vehicle 12. On the other hand, when a route on which the user will move to the destination using a combination of means of transportation including the vehicle 12 is being guided by the multimodal guidance function, the control unit 31 determines that the user 11 is in the vehicle 12. In this example, by means of the multimodal guidance function, the terminal device 30 is guiding a route on which the user will move to the destination using a combination of means of transportation including the vehicle 12. Therefore, the control unit 31 determines that the user 11 is in the vehicle 12.

After performing the processing described above, the control unit 31 ends the riding determination processing.

As described above, the determining by the terminal device 30 whether the user 11 is in the vehicle 12 includes determining whether the user 11 is in the vehicle 12 according to whether the destination has been set and whether or not the condition (C1) is satisfied that the user 11 is moving to the destination by another vehicle at the time when the signal sent from the communication device 40 is received. In FIG. 6, C1 is satisfied in step S114.

As described above, the terminal device 30 has the multimodal guidance function that guides a route on which the user will move using a combination of one or more means of transportation selected from among a plurality means of transportation including the vehicle 12. The determining by the terminal device 30 whether the user 11 is in the vehicle 12 includes determining whether the user 11 is in the vehicle 12 according to whether the destination has been set and whether or not the condition (C2) is satisfied that a route on which the user 11 will move to the destination using a combination of means of transportation including the vehicle 12 is being guided by the multimodal guidance function. In FIG. 6, C2 is satisfied in step S115.

Next, returning to FIG. 5, the control unit 31 generates first data notifying about the destination set by the user 11 together with the user identifier "U1" corresponding to the user 11. The control unit 31 stores the generated first data in the storage unit 32. The control unit 31 sends the first data, stored in the storage unit 32, to the control device 20 via the communication unit 33.

Next, in step S116, the control unit 31 displays a message to the user 11. In this example, the message to user 11 is displayed on the screen of the terminal device 30. Instead of being displayed on the screen of the terminal device 30, the message to user 11 may be output by voice, for example, through the speaker of the terminal device 30.

Figure 7:
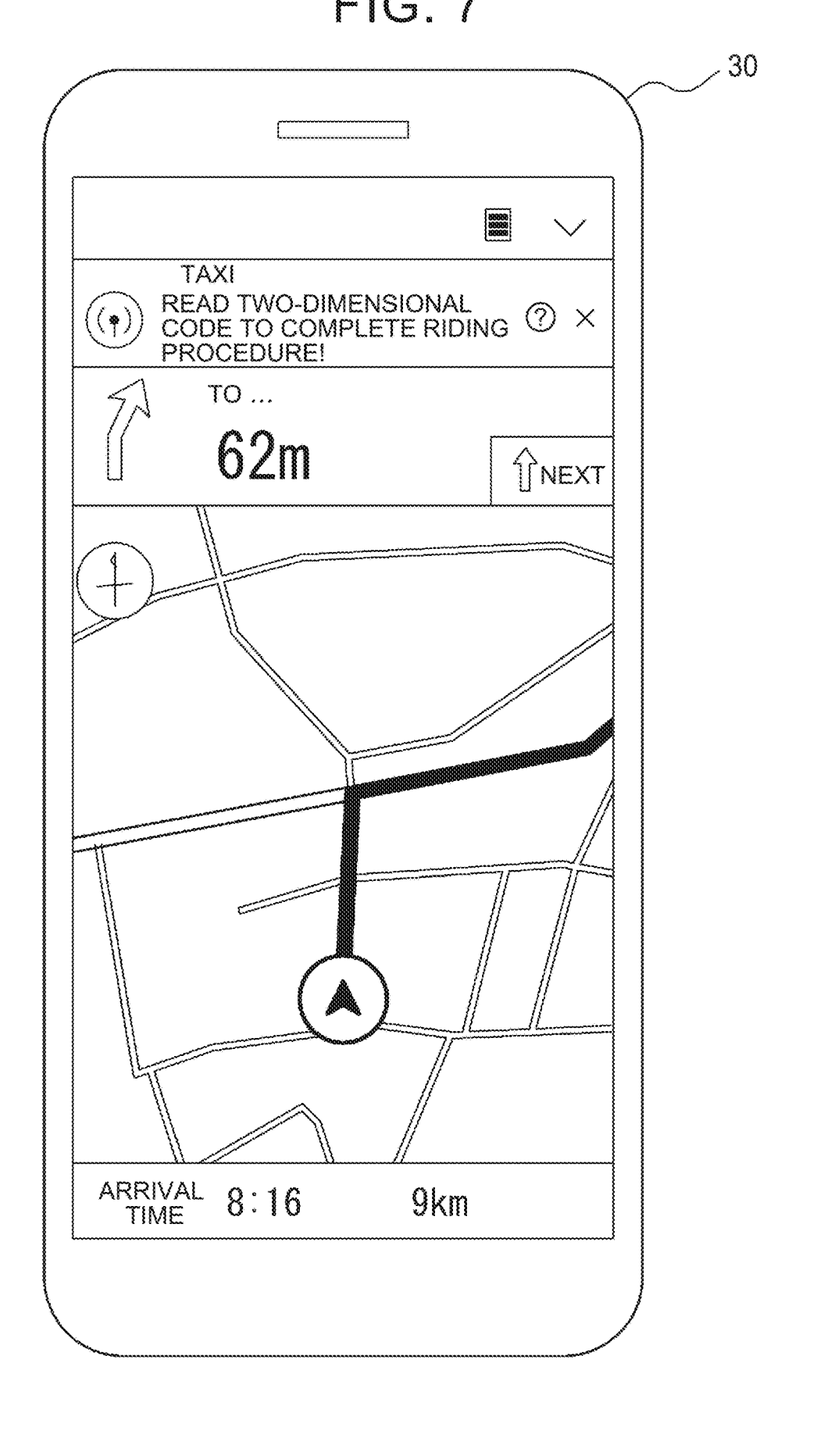
FIG. 7 is a diagram showing an example of the screen of the terminal device according to the embodiment of the present disclosure.

FIG. 7 shows an example of the screen of the terminal device 30. As shown in FIG. 7, the control unit 31 displays an icon indicating that the beacon has been received and a text message reading "Read the two-dimensional code to complete the riding procedure!" on the screen of the multimodal navigation application that is running in the terminal device 30.

In step S117, the terminal device 30 of user 11 is operated by the user 11.

In this example, the user 11 points the camera of the terminal device 30 at the display that displays the vehicle identifier "V1" in the cabin of the vehicle 12. In one modification, the user 11 may place the tag of the terminal device 30 over the reader/writer that sends the vehicle identifier "V1" in the cabin of the vehicle 12.

In step S118, the control unit 31 of the terminal device 30 of the user 11 acquires the vehicle identifier "V1" corresponding to the vehicle 12 in response to the operation of the user 11 in step S117. The control unit 31 generates second data notifying about the acquired vehicle identifier "V1" together with the user identifier "U1". The control unit 31 stores the generated second data in the storage unit 32. The control unit 31 sends the second data, stored in the storage unit 32, to the control device 20 via the communication unit 33.

In this example, the control unit 31 of the terminal device 30 performs control to capture the vehicle identifier "V1", displayed in the cabin of the vehicle 12, to acquire the vehicle identifier "V1". More specifically, the control unit 31 performs control to capture the vehicle identifier "V1", displayed in the form of a two-dimensional code, with the camera to acquire the vehicle identifier "V1". In one modification, the control unit 31 may perform control to receive the vehicle identifier "V1", sent in the cabin of the vehicle 12, to acquire the vehicle identifier "V1". More specifically, the control unit 31 may perform control to receive the vehicle identifier "V1", sent via near-field wireless communication, with the tag to acquire the vehicle identifier "V1". The control unit 31 sends the acquired vehicle identifier "V1" to the control device 20 together with the user identifier "U1".

In step S119, the control unit 21 of the control device 20 receives the second data from the terminal device 30 of the user 11 via the communication unit 23. The control unit 21 stores the received second data in the storage unit 22. The control unit 21 associates the user 11 with the vehicle 12 by referring to the first data and the second data both of which are stored in the storage unit 22 with the common user identifier "U1" The control unit 21 generates destination data notifying about the destination notified by the referenced first data. The control unit 21 stores the generated destination data in the storage unit 22. The control unit 21 sends the destination data, stored in the storage unit 22, to the communication device 40 in the vehicle 12, corresponding to the vehicle identifier "V1" notified by the referenced second data, via the communication unit 23. That is, the control unit 21 sends the destination data, which notifies about the destination set by the user 11, to the communication device 40 in the vehicle 12 associated with the user 11.

In this example, the control unit 21 of the control device 20 notifies the communication device 40, which is used in the vehicle 12 corresponding to the vehicle identifier "V1" sent from the terminal device 30 together with the user identifier "U1", of the destination notified by the terminal device 30 together with the user identifier "U1".

In step S120, the control unit 41 of the communication device 40 in the vehicle 12 receives the destination data, sent as a result of the processing in step S119, from the control device 20 via the communication unit 43. The control unit 41 stores the received destination data in the storage unit 42. The control unit 41 sets the destination based on the destination data stored in the storage unit 42.

In this example, the control unit 41 of the communication device 40 sets the destination, notified by the control device 20, in the car navigation application, running on the communication device 40, as the destination for car navigation.

In step S121, the control unit 41 of the communication device 40 in the vehicle 12 acquires the position data on the vehicle 12 via the positioning unit 46. The control unit 41 stores the acquired position data on the vehicle 12 in the storage unit 42. The control unit 41 sends the position data on the vehicle 12, stored in the storage unit 42, to the control device 20 via the communication unit 43.

In this example, the control unit 41 of the communication device 40 acquires the two-dimensional coordinates or the three-dimensional coordinates of the current position of the vehicle 12 as the position data on the vehicle 12. The control unit 41 sends the acquired position data on the vehicle 12, together with the vehicle identifier "V1", to the control device 20.

In step S122, the control unit 21 of the control device 20 receives the position data on the vehicle 12, sent in step S121, from the communication device 40 in the vehicle 12 via the communication unit 23. The control unit 21 stores the received position data on the vehicle 12 in the storage unit 22. The control unit 21 determines a route to the destination, notified together with the user identifier "U1" in the first data stored in the storage unit 22, according to the position data on the vehicle 12 stored in the storage unit 22. The control unit 21 stores the route data, which notifies about the determined route, in the storage unit 22. The control unit 21 sends the route data, stored in the storage unit 22, to the communication device 40 in the vehicle 12 via the communication unit 23.

In this example, the control unit 21 of the control device 20 calculates a route by referring to the map information stored in advance in the storage unit 22. This route is from the point, corresponding to the position data on the vehicle 12 sent from the communication device 40 together with the vehicle identifier "V1", to the destination notified by the terminal device 30 together with the user identifier "U1". The control unit 31 notifies the communication device 40 of the calculated route.

In step S123, the control unit 41 of the communication device 40 in the vehicle 12 receives the route data, sent in step S122, from the control device 20 via the communication unit 43. The control unit 41 stores the received route data in the storage unit 42. The control unit 41 performs control to guide the driver of the vehicle 12 along the route notified in the form of the route data stored in the storage unit 42. According to this control, the output unit 45 of the communication device 40 outputs the route to the destination, set by the user 11, on the screen to guide the driver of the vehicle 12.

In this example, the control unit 41 of the communication device 40 displays the route, notified by the control device 20, on the screen of the car navigation application running on the communication device 40.

The processing from steps S121 to step S123 is repeatedly performed until the vehicle 12 arrives at the destination.

As described above, in this embodiment, the terminal device 30 includes the communication unit 33, which communicates with the communication device 40 used in the vehicle 12, and the control unit 31. When the signal sent from the communication device 40 is received via the communication unit 33, the control unit 31 determines whether the user 11 is in the vehicle 12 according to whether the destination has been set by the user 11.

When using the vehicle 12 to move, the user 11 sets the destination before riding in the vehicle 12. When the user 11 has not set the destination at the time the control unit 31 of the terminal device 30 receives the beacon emitted by the vehicle 12, there is a low possibility that the user 11 will use the vehicle 12. Taking this into account, even if the terminal device 30 of the user 11 who has not set the destination, that is, who does not intend to move by the vehicle 12, mistakenly receives the beacon emitted by the vehicle 12, the control unit 31 does not determine that the user 11 is in the vehicle 12. Therefore, this embodiment makes it easy to prevent an erroneous determination that the user 11 is in the vehicle 12, improving the accuracy in determining whether the user 11 is in the vehicle.

In one modification of this embodiment, the control unit 31 may determine whether the user 11 is in the vehicle, according to whether a route is being guided using the single-modal guidance function instead of the multimodal guidance function. In this case, the control unit 31 of the terminal device 30 has the single-modal guidance function. The single-modal guidance function guides a route on which the user 11 will move, using one of the means of transportation, either first means of transportation including the vehicle 12 or the second means of transportation not including the vehicle 12, whichever is selected by the user 11. When the destination has been set and, in addition, a route on which the user 11 will move to the destination using the second means of transportation is being guided by the single-modal guidance function, the control unit 31 determines that the user 11 is not in the vehicle 12.

Figure 8:
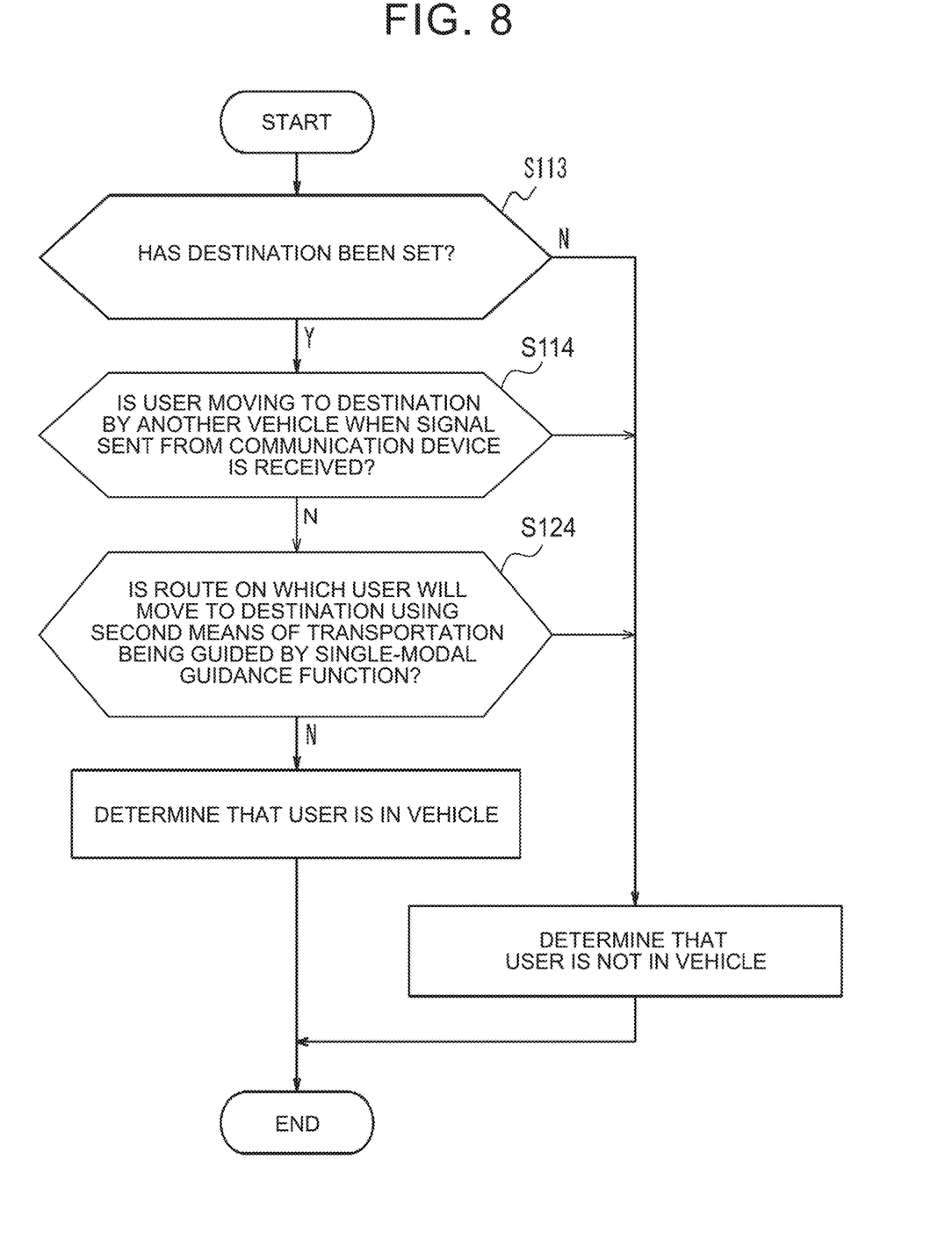
FIG. 8 is a flowchart showing the operation of the control unit of the terminal device according to a modification.

The determination flow of the control unit 31 in this modification is shown in FIG. 8. In FIG. 8, the processing in step S115 in FIG. 6 is replaced by the processing in step S124. The processing other than that in step 124 is the same as the processing shown in FIG. 6.

Referring to FIG. 8, after the processing in step S113 and step S114, the control unit 31 checks whether a route on which the user 11 will move to the destination is being guided by the single-modal guidance function in which the second means of transportation is selected from the two means of transportation (first means of transportation including the vehicle 12 and second means of transportation not including the vehicle 12). The single-modal guidance function mentioned here is the function in which the control unit 31 guides a single-modal route for the user 11. When a route on which the user will move to the destination using the second means of transportation is being guided by the single-modal guidance function, the control unit 31 determines that the user 11 is not in the vehicle 12. On the other hand, when a route on which the user will move to the destination using the first means of transportation is being guided, the control unit 31 determines that the user 11 is in the vehicle 12. After that, the control unit 31 ends the determination processing.

As described above, the terminal device 30 has the single-modal guidance function. The single-modal guidance function guides a route on which the user 11 will move, using one of the two means of transportation, either first means of transportation including the vehicle 12 or the second means of transportation not including the vehicle 12, whichever is selected by the user 11. The determining by the terminal device 30 whether the user 11 is in the vehicle 12 includes determining whether the user 11 is in the vehicle 12 according to whether the destination has been set and whether or not the condition (C3) is satisfied that a route on which the user 11 will move to the destination using the second means of transportation is being guided by the single-modal guidance function. In FIG. 8, whether or not C3 is satisfied is determined in step S124.

When the user 11 selects means of transportation other than the vehicle 12, such as walking or a train, and then the guidance of a single-modal route using the selected means of transportation is started, there is a low possibility that, while the single-modal route is being guided, the user 11 will change the means of transportation to the vehicle 12 that is one of the other means of transportation. Taking this into account, even if the user 11 who does not intend to move by the vehicle 12 mistakenly receives the beacon emitted by the vehicle 12, the control unit 31 does not determine that the user 11 is in the vehicle 12. Therefore, this modification prevents an erroneous determination that the user 11 is in the vehicle 12, improving the accuracy in determining whether the user 11 is in the vehicle.

As described above, in this embodiment, the control unit 31 has the multimodal guidance function. The multimodal guidance function is the function that guides a route on which the user 11 will move using a combination of one or more means of transportation selected from among a plurality of types of transportation including the vehicle 12. When the destination has been set and a route on which the user 11 will move to the destination using a combination of means of transportation including the vehicle 12 is being guided by the multimodal guidance function, the control unit 31 determines that the user 11 is in the vehicle 12.

When the guidance of a multimodal route, which uses a combination of means of transportation including the vehicle 12, is started, there is a possibility that the user 11 will change the means of transportation from the means of transportation other than the vehicle 12, such as walking or a train, to the vehicle 12 while the route is being guided. Taking this into account, even if the terminal device 30 of the user 11 to whom a multi-modal route guidance is not being given, that is, who does not intend to move by the vehicle 12, receives the beacon emitted by the vehicle 12, the control unit 31 does not determine that the user 11 is in the vehicle 12. Therefore, this embodiment prevents an erroneous determination that the user 11 is in the vehicle 12, improving the accuracy in determining whether the user 11 is in the vehicle.

As described above, in this embodiment, the control unit 31 determines that the user 11 is not on the vehicle 12 when the destination has been set and, in addition, the user 11 is moving to the destination by another vehicle at the time when the signal sent from the communication device 40 is received.

While the user 11 is in a vehicle other than the vehicle 12, the terminal device 30 may sometimes receive the beacon emitted by the vehicle 12 that happens to be traveling nearby. In such a case, there is a low possibility that the user 11 will change the vehicle from the vehicle, in which the user 11 is travelling, to the vehicle 12 that emits the beacon. Taking this into account, even if the terminal device 30 of the user 11 who does not intend to move by the vehicle 12 receives the beacon emitted by the vehicle 12, the control unit 31 does not determine that the user 11 is in the vehicle 12. Therefore, this embodiment makes it easy to prevent an erroneous determination that the user 11 is in the vehicle 12, improving the accuracy in determining whether the user 11 is in the vehicle.

In one modification of this embodiment, the control unit 31 may determine whether the user 11 is in the vehicle 12 according to whether the vehicle dispatch application, a program for receiving the vehicle dispatch service, is activated in the terminal device 30.

For example, in FIG. 5, when the riding determination processing is performed in step S112 after the beacon is received from the communication device 40, the control unit 31 checks whether the vehicle dispatch application is activated in the terminal device 30. The control unit 31 monitors the activation status of one or more applications running in the terminal device 30 and determines whether the vehicle dispatch application is included in the one or more applications that are activated. The applications that are activated include an application through which the user 11 is performing an input operation and the applications that are activated in the background. The control unit 31 determines that the user 11 is not in the vehicle 12 when the vehicle dispatch application is not activated in the terminal device 30. The control unit 31 determines that the user 11 is in the vehicle 12 when the vehicle dispatch application is activated in the terminal device 30.

According to this modification, there is a high possibility that the user 11 calls a taxi, which is the vehicle 12, by the vehicle dispatch application and uses the vehicle 12. Taking this into account, even if the terminal device 30 of user 11 who does not have the vehicle dispatch application activated, that is, who does not intend to move by the vehicle 12, receives the beacon emitted by the vehicle 12, the control unit 31 does not determine that the user 11 is in the vehicle 12. Therefore, this embodiment makes it easy to prevent an erroneous determination that the user 11 is in the vehicle 12, improving the accuracy in determining whether the user 11 is in the vehicle.

As described above, according to this embodiment, the terminal device 30 further includes the input unit 34 that accepts an input of the set value of a destination from the user 11.

This embodiment improves the convenience for the user 11 to set a destination.

In this embodiment, the communication unit 33 of the terminal device 30 communicates with the control device 20 that notifies the communication device 40, used in the vehicle 12 in which the user 11 is traveling, of the destination set by the user 11. The control unit 31 of the terminal device 30 sends the first data, which notifies about the destination together with the user identifier "U1" corresponding to the user 11, to the control device 20 via the communication unit 33. In response to an operation of the user 11, the control unit 31 acquires the vehicle identifier "V1" corresponding to the vehicle 12. The control unit 31 sends the second data, which notifies about the vehicle identifier "V1" together with the user identifier "U1", to the control device 20 via the communication unit 33.

Therefore, this embodiment allows the information on the destination, which is set by the user 11, to be used for setting the destination of the vehicle 12 in which the user 11 is travelling.

In this embodiment, when the beacon (signal) is received from the communication device 40, the control unit 31 of the terminal device 30 notifies the user 11 of a message prompting the user 11 to perform the operation of the riding procedure.

Even if the user 11 simply forgets to perform the riding procedure, this embodiment prompts the user to perform the riding procedure by reminding the user that the setting of the destination will be used for the vehicle 12.

The present disclosure is not limited to the above embodiment. For example, a plurality of blocks included in the block diagram may be integrated, or one block may be divided. Instead of performing the steps shown in the flowchart in chronological order according to the description, the steps may be performed in parallel or in a different order depending on the processing capability of the device that performs the steps or depending on the necessity. Other changes may be made without departing from the spirit of the present disclosure.

What is claimed is:

1. A non-transitory computer readable medium storing a riding determination program that when executed causes a computer to:
perform an operation when a signal sent from a communication device is received via a communication unit, the computer comprising the communication unit configured to communicate with the communication device used in a vehicle, the operation including determining whether a user is in the vehicle according to at least one of whether a destination has been set by the user and whether a vehicle dispatch application is activated, the vehicle dispatch application being a program for receiving a vehicle dispatch service, wherein
the determining includes determining whether the user is in the vehicle according to whether the destination has been set and whether or not a condition is satisfied that the user is moving to the destination by another vehicle at a time when the signal sent from the communication device is received, and
the determining includes determining whether the user is moving by the other vehicle based on a time when the user was determined to ride last according to a riding determination history of the computer.

2. The non-transitory computer readable medium according to claim 1, wherein:
the computer has a single-modal guidance function that guides a route on which the user is to move using one of means of transportation, either first means of transportation including the vehicle or second means of transportation not including the vehicle, whichever is selected by the user; and
the determining includes determining whether the user is in the vehicle according to whether the destination has been set and whether or not a condition is satisfied that a route on which the user is to move to the destination using the second means of transportation is being guided by the single-modal guidance function.

3. The non-transitory computer readable medium according to claim 1, wherein:
the computer has a multimodal guidance function that guides a route on which the user is to move using a combination of one or more means of transportation selected from among a plurality means of transportation including the vehicle; and
the determining includes determining whether the user is in the vehicle according to whether the destination has been set and whether or not a condition is satisfied that a route on which the user is to move to the destination using the combination of means of transportation including the vehicle is being guided by the multimodal guidance function.

4. The non-transitory computer readable medium according to claim 1, wherein the operation further includes accepting an input to set the destination by the user.

5. The non-transitory computer readable medium according to claim 1, wherein the operation further includes:
sending first data to a control device via the communication unit, the first data notifying about the destination together with a user identifier corresponding to the user, the control device notifying the communication device of the destination;
acquiring a vehicle identifier corresponding to the vehicle in response to an operation of the user; and
sending second data to the control device, the second data notifying about the vehicle identifier together with the user identifier.

6. The non-transitory computer readable medium according to claim 5, wherein the riding determination program causes the computer to notify the user of a message prompting the user to perform the operation when the signal is received.

7. A terminal device comprising:
a communication interface configured to communicate with a communication device used in a vehicle; and circuitry configured to:
   determine whether a user is in the vehicle when a signal sent from the communication device is received via the communication interface, according to at least one of whether a destination has been set by the user and whether a vehicle dispatch application is activated, the vehicle dispatch application being a program for receiving a vehicle dispatch service,
   determine whether the user is in the vehicle according to whether the destination has been set and whether or not a condition is satisfied that the user is moving to the destination by another vehicle at a time when the signal sent from the communication device is received, and
   determine whether the user is moving by the other vehicle based on a time when the user was determined to ride last according to a riding determination history of the terminal device.

8. The terminal device according to claim 7, wherein the circuitry:
   has a single-modal guidance function that guides a route on which the user is to move using one of means of transportation, either first means of transportation including the vehicle or second means of transportation not including the vehicle, whichever is selected by the user; and
   is configured to determine whether the user is in the vehicle according to whether the destination has been set and whether or not a condition is satisfied that a route on which the user is to move to the destination using the second means of transportation is being guided by the single-modal guidance function.

9. The terminal device according to claim 7, wherein the circuitry:
   has a multimodal guidance function that guides a route on which the user is to move using a combination of one or more means of transportation selected from among a plurality means of transportation including the vehicle; and
   is configured to determine whether the user is in the vehicle according to whether the destination has been set and whether or not a condition is satisfied that a route on which the user is to move to the destination using the combination of means of transportation including the vehicle is being guided by the multimodal guidance function.

10. The terminal device according to claim 7, further comprising an input interface configured to accept an input to set the destination by the user.

11. The terminal device according to claim 7, wherein the circuitry is configured to send first data to a control device via the communication interface, to acquire a vehicle identifier corresponding to the vehicle in response to an operation of the user, and to send second data to the control device, the first data notifying about the destination together with a user identifier corresponding to the user, the control device notifying the communication device of the destination, the second data notifying about the vehicle identifier together with the user identifier.

12. The terminal device according to claim 11, wherein the circuitry is configured to notify the user of a message prompting the user to perform the operation when the signal is received.

13. The terminal device according to claim 11, wherein the terminal device and the control device are elements of a communication system.

14. A riding determination method comprising:
   sending, by a communication device used in a vehicle, a signal; and
   determining, by a terminal device carried by a user, whether the user is in the vehicle when the signal sent from the communication device is received, according to at least one of whether a destination has been set by the user and whether a vehicle dispatch application is activated, the vehicle dispatch application being a program for receiving a vehicle dispatch service, wherein
   the determining includes determining whether the user is in the vehicle according to whether the destination has been set and whether or not a condition is satisfied that the user is moving to the destination by another vehicle at a time when the signal sent from the communication device is received, and
   the determining includes determining whether the user is moving by the other vehicle based on a time when the user was determined to ride last according to a riding determination history of the terminal device.

15. The riding determination method according to claim 14, wherein:
   the terminal device has a single-modal guidance function that guides a route on which the user is to move using one of means of transportation, either first means of transportation including the vehicle or second means of transportation not including the vehicle, whichever is selected by the user; and
   the determining includes determining whether the user is in the vehicle according to whether the destination has been set and whether or not a condition is satisfied that a route on which the user is to move to the destination using the second means of transportation is being guided by the single-modal guidance function.

16. The riding determination method according to claim 14, wherein:
   the terminal device has a multimodal guidance function that guides a route on which the user is to move using a combination of one or more means of transportation selected from among a plurality means of transportation including the vehicle; and
   the determining includes determining whether the user is in the vehicle according to whether the destination has been set and whether or not a condition is satisfied that a route on which the user is to move to the destination using the combination of means of transportation including the vehicle is being guided by the multimodal guidance function.

17. The riding determination method according to claim 14, the riding determination method further comprising:
   sending, by the terminal device, first data to a control device, the first data notifying about the destination together with a user identifier corresponding to the user, the control device notifying the communication device of the destination;
   acquiring, by the terminal device, a vehicle identifier corresponding to the vehicle in response to an operation of the user; and
   sending, by the terminal device, second data to the control device, the second data notifying about the vehicle identifier together with the user identifier.

* * * * *